(12) United States Patent
Murakami et al.

(10) Patent No.: US 7,541,702 B2
(45) Date of Patent: Jun. 2, 2009

(54) BRUSHLESS FAN MOTOR

(75) Inventors: Naoki Murakami, Nagano (JP);
Hiromitsu Kuribayashi, Nagano (JP);
Katsumichi Ishihara, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 11/773,150

(22) Filed: Jul. 3, 2007

(65) Prior Publication Data
US 2008/0007128 A1 Jan. 10, 2008

(30) Foreign Application Priority Data
Jul. 5, 2006 (JP) ............... 2006-185534

(51) Int. Cl.
*H02K 9/06* (2006.01)
(52) U.S. Cl. ....................... 310/62; 310/67 R
(58) Field of Classification Search .................. 310/62, 310/67 R; 415/77, 143; 416/203, 175
See application file for complete search history.

(56) References Cited

U.S. PATENT DOCUMENTS

| 5,814,908 | A  | 9/1998  | Muszynski    |         |
|-----------|-----|---------|--------------|---------|
| 6,798,091 | B2 | 9/2004  | Kudou et al. |         |
| 6,904,960 | B1 | 6/2005  | Su et al.    |         |
| 7,117,580 | B2 | 10/2006 | Kudou et al. |         |
| 7,156,611 | B2 | 1/2007  | Oosawa et al.|         |
| 7,175,399 | B2 * | 2/2007 | Matsumoto et al. | .... 417/423.15 |
| 2005/0106026 | A1 | 5/2005 | Oosawa et al. |        |
| 2006/0119195 | A1 * | 6/2006 | Liu ............................. | 310/62 |
| 2007/0152519 | A1 * | 7/2007 | Jarrah et al. .................. | 310/58 |

FOREIGN PATENT DOCUMENTS

| DE | 101 09 621 | 9/2002 |
| EP | 1 050 682 | 11/2000 |
| EP | 1 622 244 | 2/2006 |
| FR | 2 433 846 | 3/1980 |
| GB | 1 130 700 | 10/1968 |
| JP | 58-159889 | 10/1983 |
| JP | 10-191593 | 7/1998 |
| JP | 10-210727 | 8/1998 |
| JP | 11-336778 | 12/1999 |
| JP | 2000-356200 | 12/2000 |

* cited by examiner

*Primary Examiner*—Hanh N Nguyen
(74) *Attorney, Agent, or Firm*—Rankin, Hill & Clark LLP

(57) ABSTRACT

A brushless fan motor, in which cooling effect on a stator may be enhanced, is provided. A center through hole is formed in a center of a bottom wall portion of a first brushless fan motor. Vane portions are formed on an inner wall portion of the brushless fan motor and are formed into a shape which allows ambient air to be drawn in through the center through hole. Through holes are formed in an end plate portion of the first brushless fan motor in order to introduce the ambient air, which has been drawn in through the center through hole, inside a rotor cover.

9 Claims, 3 Drawing Sheets

BRUSHLESS FAN MOTOR

BACKGROUND OF THE INVENTION

The present invention relates to a brushless fan motor and a counter-rotating axial flow fan comprising two brushless fan motors.

A brushless fan motor disclosed in Japanese Patent Publication No. 2003-230246 (Patent Document 1) includes a rotor, a stator arranged inside the rotor, and an impeller arranged outside the rotor. The rotor includes a rotor cover and a plurality of permanent magnet magnetic pole portions. The rotor cover includes a cylindrical portion and an end plate portion integrally formed at one end of the cylindrical portion and fixed to a rotary shaft. The permanent magnet magnetic pole portions are disposed on an inner circumferential surface of the cylindrical portion. The impeller includes a plurality of blades and a cap member having the blades mounted thereon. The cap member includes a cylindrical peripheral wall portion having the blades which are mounted on an outer peripheral portion of the peripheral all portion, and a bottom wall portion that is disposed at an end of the peripheral wall portion and faces the end plate portion of the rotor cover. The cap member is fit with the rotor cover. In the brushless motor of such a type, dissipation of heat generated in the stator to the outside is a problem to be solved especially when the number of rotation of the rotor is increased.

To solve this problem as described above, Japanese Patent Publication No. 10-210727 (Patent Document 2) has disclosed a motor. In the disclosed motor, an end plate portion of a rotor cover made of a metal is partially cut and raised, thereby forming a plurality of vanes. In this motor, when a rotor is rotated, ambient air is introduced inside the rotor cover by means of the vanes. The introduced ambient air is heated by heat generated in a stator and dissipated to the outside. As a result, the temperature inside the motor will decrease.

However, in the brushless fan motor of a dual structure where the cap member is fit with the rotor cover, it is difficult to reduce the temperature of the rotor cover itself. Further, in the structure where the vanes are formed on the rotor cover, the vanes may come into contact with winding portions of a stator unless assembly accuracy between the rotor cover and the stator and forming accuracy of winding portions of the stator are enhanced. For this reason, it is necessary to ensure sufficient spacing between the end plate portion of the rotor cover and the stator. This hinders reduction in dimension of the brushless fan motor in an axial direction.

An object of the present invention is to provide a brushless fan motor and a counter-rotating axial flow fan, in which cooling effect on a stator may be enhanced and of which the dimension in an axial direction may also be reduced, without requiring high assembly accuracy.

SUMMARY OF THE INVENTION

A brushless fan motor, the improvement of which is aimed at in the present invention, comprises a rotor, a stator, and an impeller. The rotor includes: a rotor cover including a cylindrical portion and an end plate portion integrally disposed at one end of the cylindrical portion and fixed to a rotary shaft; and a plurality of permanent magnet magnetic pole portions disposed on an inner circumferential surface of the cylindrical portion. The stator is disposed inside the rotor. The impeller includes a plurality of blades and a cap member onto which the blades are mounted. The cap member is fitted with the rotor cover. The cap member includes a cylindrical peripheral wall portion having an outer peripheral portion onto which the blades are mounted, and a bottom wall portion disposed at one end of the peripheral wall portion and facing the end plate portion. In the present invention, a center through hole is formed in the center of the bottom wall portion of the cap member. The center through hole pierces the bottom wall portion in an axial direction of the rotary shaft. A plurality of vane portions are formed on an inner wall portion of the bottom wall portion which faces the end plate portion at intervals in a circumferential direction of the peripheral wall portion. The vane portions are shaped to draw in ambient air through the center through hole. A plurality of through holes are formed in the end plate portion at intervals in the circumferential direction so as to introduce the ambient air, which has been drawn in through the center through hole, inside the rotor cover. The through holes pierce the end plate portion in the axial direction.

In the brushless fan motor of the present invention, when the rotor rotates, the ambient air is drawn inside the cap member through the center through hole of the cap member by rotation of the vane portions. Then, the ambient air drawn in is introduced inside the rotor cover through the through holes disposed in the end plate portion of the rotor cover. Then, the ambient air introduced inside the rotor cover is heated by heat generated in the stator, and is dissipated to the outside. The stator is thereby cooled. With this arrangement, after the end plate portion of the rotor cover has been cooled by the ambient air introduced inside the cap member, an inside of the rotor cover is cooled. For this reason, even if the cap member is fit with the rotor cover, the inside of the rotor cover may be cooled after the rotor cover itself has been partially cooled. Accordingly, the present invention may solve a problem with reduced cooling performance due to the dual structure of the rotor cover and the cap member. Since the through holes are simply formed in the rotor cover, high assembly accuracy between the rotor and stator will not be required. Thus, manufacture of the brushless fan motor is easy. Further, the vane portions do not protrude into the rotor cover, winding portions may not be damaged due to the vane portions. The dimension of the brushless fan motor in the axial direction may be reduced as much as possible.

When the vane portions are formed on the cap member of the impeller, the impeller may be formed by injection molding using a synthetic region or may be formed of a casting such as a metal die-casting. For this reason, the vane portions may respectively be formed into a desired shape that exhibits sufficient cooling effect. Thus, the cooling effect on the stator may be enhanced.

Preferably, the through holes are disposed at positions that do not face the center through hole. With this arrangement, dust or the like, which has entered into the impeller through the center through hole, may be inhibited from directly entering into the stator through the through holes.

It is also preferable that the through holes are disposed at positions which face windings of the stator. With this arrangement, the ambient air introduced inside the rotor cover through the through holes directly passes over the windings of the stator. Thus, heat generated at the windings of the stator may be alleviated by the ambient air. The cooling performance may be thereby enhanced.

The vane portions are formed at equidistant intervals in the circumferential direction of the peripheral wall portion, and the through holes are formed at equidistant intervals in the circumferential direction. In this case, it is preferable that the number of the vane portions is larger than the number of the through holes so that the vane portions do not face the through holes. The number of the vane portions, for example, should be larger than the number of the through holes by one so that the number of the vanes may not be a multiple of the number of the through holes. With this arrangement, even if the cap member is arbitrarily combined with the rotor cover, no vane portions will face (overlap) the through holes. As a result, assembly of the brushless fan motor will be facilitated, and a required amount of ambient air may be reliably introduced inside the rotor cover through the through holes.

It is preferable that the vane portions and the cap member are integrally formed by injection molding or casting. With this arrangement, the vane portions may be formed together with the impeller, and the vane portions may respectively be formed into a desired shape that exhibits the sufficient cooling effect. For this reason, the cooling effect on the stator may be enhanced.

A counter-rotating axial flow fan, the improvement of which is aimed at in the present invention, comprises a first axial flow fan unit and a second axial flow fan unit. The first axial flow fan unit includes a first casing and a first brushless fan motor. The first casing includes an air channel having a suction-side opening on one side of the first brushless fan motor in an axial direction of a rotary shaft of the first brushless fan motor and a discharge-side opening on the other side of the first brushless fan motor in the axial direction. The first brushless fan motor includes an impeller that rotates inside the suction-side opening. The second axial flow fan unit includes a second casing and a second brushless fan motor. The second casing includes an air channel having a suction-side opening on one side of the second brushless fan motor in the axial direction of a rotary shaft of the second brushless fan motor and a discharge-side opening on the other side of the second brushless fan motor in the axis line direction. The second brushless fan motor includes an impeller that rotates inside the discharge-side opening. The first casing of the first axial flow fan unit is coupled with the second casing of the second axial flow fan unit via a coupling structure. The first and second brushless fan motors respectively include a rotor, a stator, and the impeller. The rotor includes a rotor cover including a cylindrical portion and an end plate portion integrally disposed at an end of the cylindrical portion and fixed to the rotary shaft; and a plurality of permanent magnet magnetic pole portions disposed on an inner circumferential surface of the cylindrical portion. The stator is disposed inside the rotor. The impeller includes a plurality of blades and a cap member onto which the blades are mounted. The cap member is fitted with the rotor cover. The cap member includes a cylindrical peripheral wall portion including an outer peripheral portion onto which the blades are mounted and a bottom wall portion disposed at an end of the peripheral wall portion and facing the end plate portion. The first brushless fan motor is arranged so that the bottom wall portion of the cap member of the first brushless fan motor is located in the suction-side opening of the first brushless fan motor. The second brushless fan motor is arranged so that the bottom wall portion of the cap member of the second brushless fan motor is located in the discharge-side opening of the second brushless fan motor. In the present invention, a center through hole is formed in the center of the bottom wall portion of the cap member of the first brushless fan motor. The center through hole pierces the bottom wall portion in the axial direction of the rotary shaft of the first brushless fan motor. A plurality of vane portions are formed on an inner wall portion of the bottom wall portion of the first brushless fan motor, which faces the end plate portion, at intervals in a circumferential direction of the peripheral wall portion. The vane portions are shaped to draw in ambient air through the center through hole. Then, a plurality of through holes are formed in the end plate portion of the first brushless fan motor at intervals in the circumferential direction so as to introduce the ambient air, which has been drawn in through the center through hole, inside the rotor cover. The through holes pierce the end plate portion in the axial direction.

In the counter-rotating axial flow fan of the present invention, when the rotor rotates, the ambient air drawn in by rotation of the vane portions of the first brushless fan motor through the center through hole of the cap member of the first brushless fan motor is introduced inside the rotor cover through the through holes of the first brushless fan motor. With this arrangement, heat generated in the stator of the first brushless fan is dissipated to the outside, thereby cooling the stator. In the counter-rotating axial flow fan, a rotational speed of the first brushless fan motor is generally faster than a rotational speed of the second brushless fan motor. Thus, the stator of the first brushless fan motor tends to be heated. For this reason, according to the present invention, the stator of the first brushless fan motor in the counter-rotating axial flow fan may be efficiently cooled, and performance of the counter-rotating axial flow fan may be thereby enhanced.

Preferably, a center through hole is formed in the center of the bottom wall portion of the cap member of the second brushless fan motor, and a plurality of through holes are formed in the end plate portion of the second brushless fan motor at intervals in the circumferential direction. The center through hole pierces the bottom wall portion in the axial direction of the rotary shaft of the second brushless fan motor. The through holes pierce the end plate portion in the axial direction of the rotary shaft of the second brushless fan motor. With this arrangement, the ambient air introduced by rotation of the first brushless fan motor passes through the rotor cover of the second brushless fan motor, and then flows out through the through holes of the second brushless fan motor. For this reason, the stator of the second brushless fan motor may also be cooled. In this case as well, it is preferable that the through holes are disposed at positions that do not face the center through hole. With this arrangement, no access to an inside of the stator can be made through the center through hole. Thus, windings of the stator will not be damaged by an intruding object from the outside before the brushless fan motor is installed in a system to be cooled.

Preferably, the first and second brushless fan motors respectively have a metal bearing holder to receive bearing that rotatably supports the rotary shaft and the first and second discrete axial flow fans are combined in a condition that the bearing holder of the first brushless fan motor is in contact with the bearing holder of the second brushless fan motor to allow heat transfer therebetween. With this arrangement, heat generated in the stator of the first brushless fan motor is transferred from the bearing holder of the first brushless fan motor to the bearing holder of the second brushless fan motor. For this reason, cooling effect on the stator of the first brushless fan motor may be further enhanced.

According to the present invention, after the endplate portion of the rotor cover has been cooled by the ambient air introduced inside the cap member, the inside of the rotor cover is cooled. For this reason, even if the cap member is fit with the rotor cover, the inside of the rotor cover may be cooled after the rotor cover itself has been partially cooled. Accordingly, the present invention may solve a problem with reduced cooling performance due to a dual structure of the rotor cover and the cap member. Since the through holes are simply formed in the rotor cover, high assembly accuracy between the rotor and stator will not be required. Thus, manufacture of the brushless fan motor is easy. Further, the vane portions do not protrude into the rotor cover, the windings may not be damaged due to the vane portions. The dimension of the brushless fan motor in the axial direction may be reduced as much as possible.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

DETAILED DESCRIPTION OF THE PREFERRED EMBODIMENTS

Figure 1:
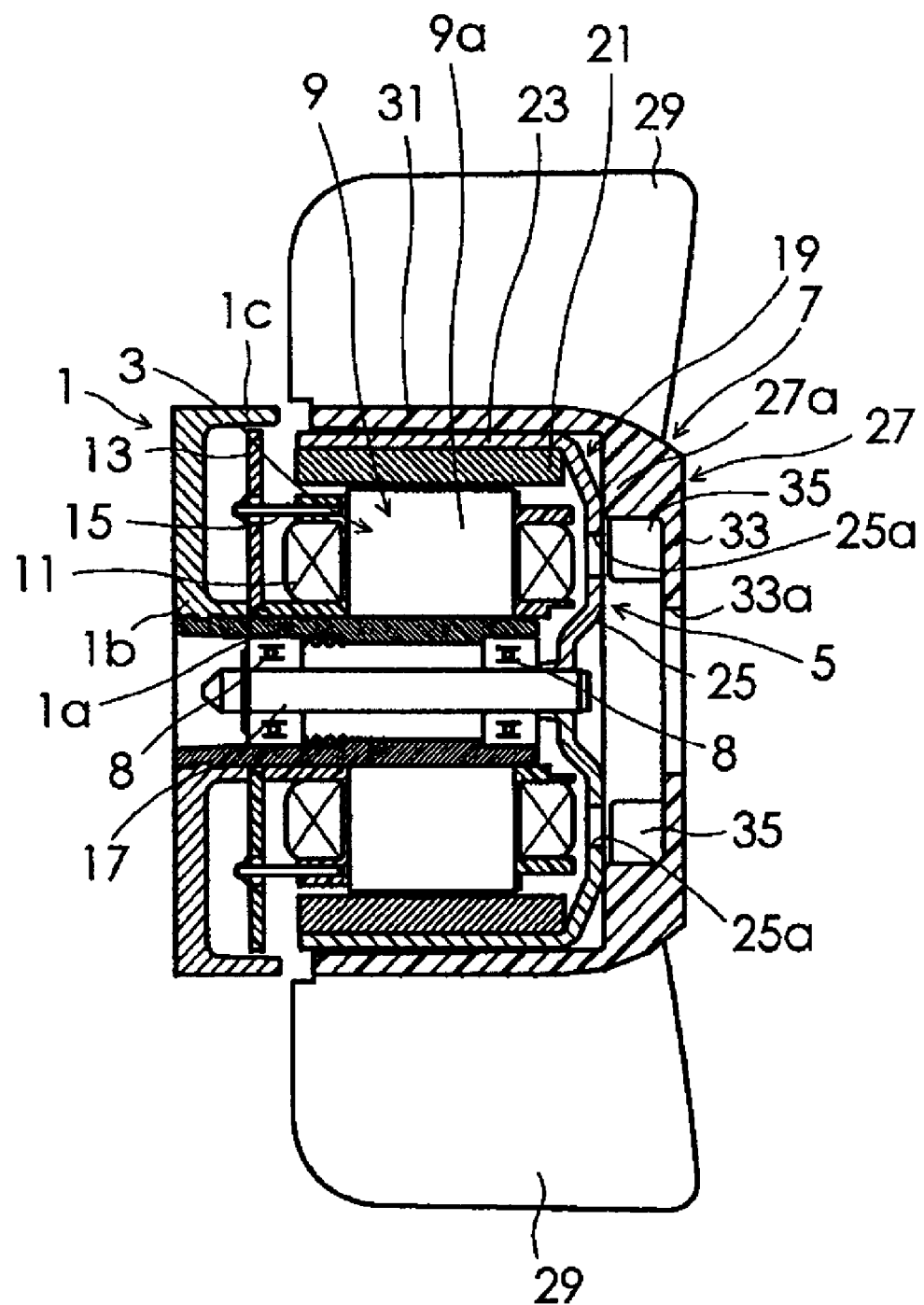
FIG. 1 is a sectional view of a brushless fan motor in an embodiment of the present invention.

Embodiments of the present invention will now be described in detail with reference to the accompanying drawings. FIG. 1 is a sectional view of a brushless motor in an embodiment of the present invention. As shown in FIG. 1, the brushless fan motor in this embodiment includes a cover member 1, a stator 3, a rotor 5, and an impeller 7. The cover member 1 includes a bearing holder 1a, a plate-like portion 1b, and an outside cylindrical portion 1c. In the bearing holder 1a, two bearings 8 that rotatably support a rotary shaft 17 of the rotor 5, which will be described later, are received. The plate-like portion 1b is coupled to the bearing holder 1a and extends in a radial direction of the rotary shaft 17. The outside cylindrical portion 1c extends from outer ends of the plate-like portion 1b in a centerline direction of the bearing holder 1a, along the bearing holder 1a. The bearing holder 1a is formed of brass. The plate-like portion 1b and the outside cylindrical portion 1c are integrally formed of a resin.

The stator 3 includes an iron core 9 formed by stacking a plurality of steel plates. The iron core 9 has a plurality of projecting pole portions 9a arranged in a circumferential direction. Then, a winding 11 is wound around each of the projecting pole portions 9a. These projecting pole portions 9a function as stator magnetic poles when the winding 11 is excited.

A circuit substrate 13 is fixed to the cover member 1 and the stator 3. At the back of the circuit substrate 13 that faces the plate-like portion 1b of the cover member 1, a plurality of electronic components constituting a control circuit that controls a current to be supplied to the winding 11 are mounted. A lead wire of the winding 11 is passed through a through hole of the circuit substrate 13 and is wound around a terminal pin 15 soldered to an electrode on the circuit substrate 13. The control circuit on the circuit substrate 13 and the winding 11 are thereby electrically connected.

Figure 2:
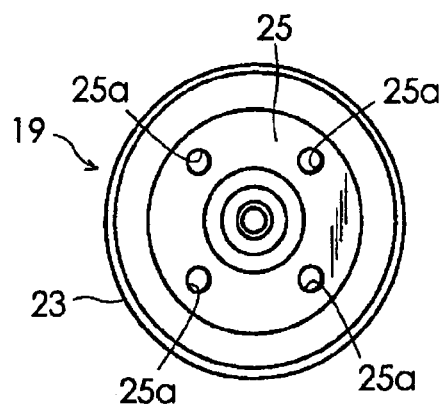
FIG. 2 is a plan view of a rotor cover as seen from a right side of FIG. 1.

The rotor 5 includes the rotary shaft 17, a rotor cover 19, and a plurality of permanent magnet magnetic pole portions 21. As shown in FIGS. 1 and 2, the rotor cover 19 integrally includes a cylindrical portion 23 and an end plate portion 25. The end plate portion 25 is integrally disposed at one end of the cylindrical portion 23 and is fixed to the rotary shaft 17. The rotor cover 19 is formed by pressing a magnetic steel plate. FIG. 2 is a plan view of the rotor cover 19 as seen from a right side of FIG. 1. On an inner circumferential surface of the cylindrical portion 23 of the rotor cover 19, the permanent magnetic portions 21 are disposed so that the permanent magnetic portions 21 face the projecting pole portions 9a. Four through holes 25a that pierce the end plate portion 25 in an axial direction of the rotary shaft 17 are formed in the end plate portion 25 of the rotor cover 19. The four through holes 25a are formed at equidistant intervals on the circumference of an imaginary circle that is concentric with the rotary shaft 17.

Figure 3:
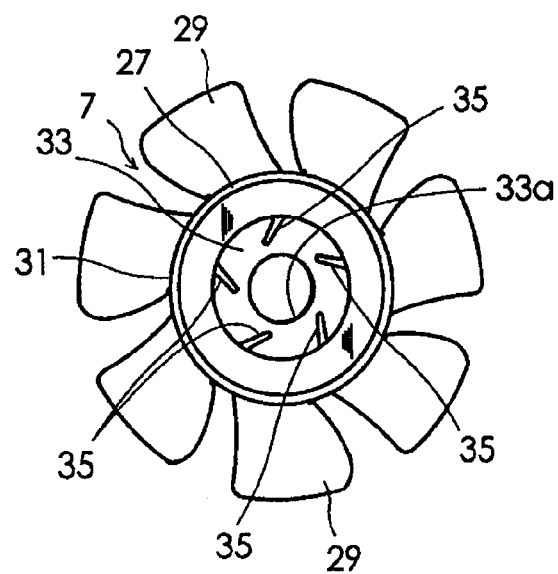
FIG. 3 is a rear view of an impeller as seen from a left side of FIG. 1.

As shown in FIGS. 1 and 3, the impeller 7 integrally includes a cap member 27 and seven blades 29 mounted on the cap member 27. In this embodiment, the impeller 7 is formed by injection molding a synthetic resin material. FIG. 3 is a rear view of the impeller 7 as seen from a left side of FIG. 1. The cap member 27 includes a cylindrical peripheral wall portion 31 having an outer peripheral portion onto which the seven blades 29 are mounted and a bottom wall portion 33. The bottom wall portion 33 is disposed at one end of the peripheral wall portion 31 and faces the end plate portion 25 of the rotor cover 19. The cap member 27 is fit with the rotor cover 19. In the center of the bottom wall portion 33, a center through hole 33a is formed, piercing the bottom wall portion 33 in the axial direction of the rotary shaft 17. The four through holes 25a in the rotor cover 19 described above and the center through hole 33a are disposed at positions where the through hole 25a and the center through hole 33a do not face to each other. The four through holes 25a are formed at positions that face the bottom wall portion 33.

Between the bottom wall portion 33 and the peripheral wall portion 31, an annular step portion 27a is formed. On an inner wall portion of the bottom wall portion 33, which faces the end plate portion 25, five vane portions 35 are formed. The number of the vane portions 35 is five, and is different from the number of the through holes 25a, which is four. The five vane portions 35 are respectively formed into a shape which allows ambient air to be drawn in through the center through hole 33a. The five vane portions are arranged at equidistant intervals in a circumferential direction of the peripheral wall portion 31. Specifically, the five vane portions 35 are curved and inclined in such a manner that the vane portions 35 are gradually departing from imaginary radial lines extending from an axis line of the rotary shaft 17 toward the peripheral wall portion 31. Then, the vane portions 35 respectively extend from the step portion 27a toward the center through hole 33a.

In the brushless fan motor of this embodiment, when the rotor 5 rotates, the ambient air, which has been drawn in through the center through hole 33a of the cap member 27 by rotation of the five vane portions 35, is introduced inside the rotor cover 19 through the four through holes 25a. With this arrangement, heat generated in the stator 3 is dissipated by the ambient air, thereby cooling the stator 3. In this embodiment, the five vane portions 35 are formed on the cap member 27 of the impeller 7. Thus, when the impeller 7 is injection molded using a synthetic resin material, the vane portions 35 may be formed together with the impeller 7. In addition, the five vane portions 35 may respectively be formed into a desired shape that exhibits sufficient cooling effect. For this reason, the cooling effect on the stator 3 may be enhanced.

Figure 4:
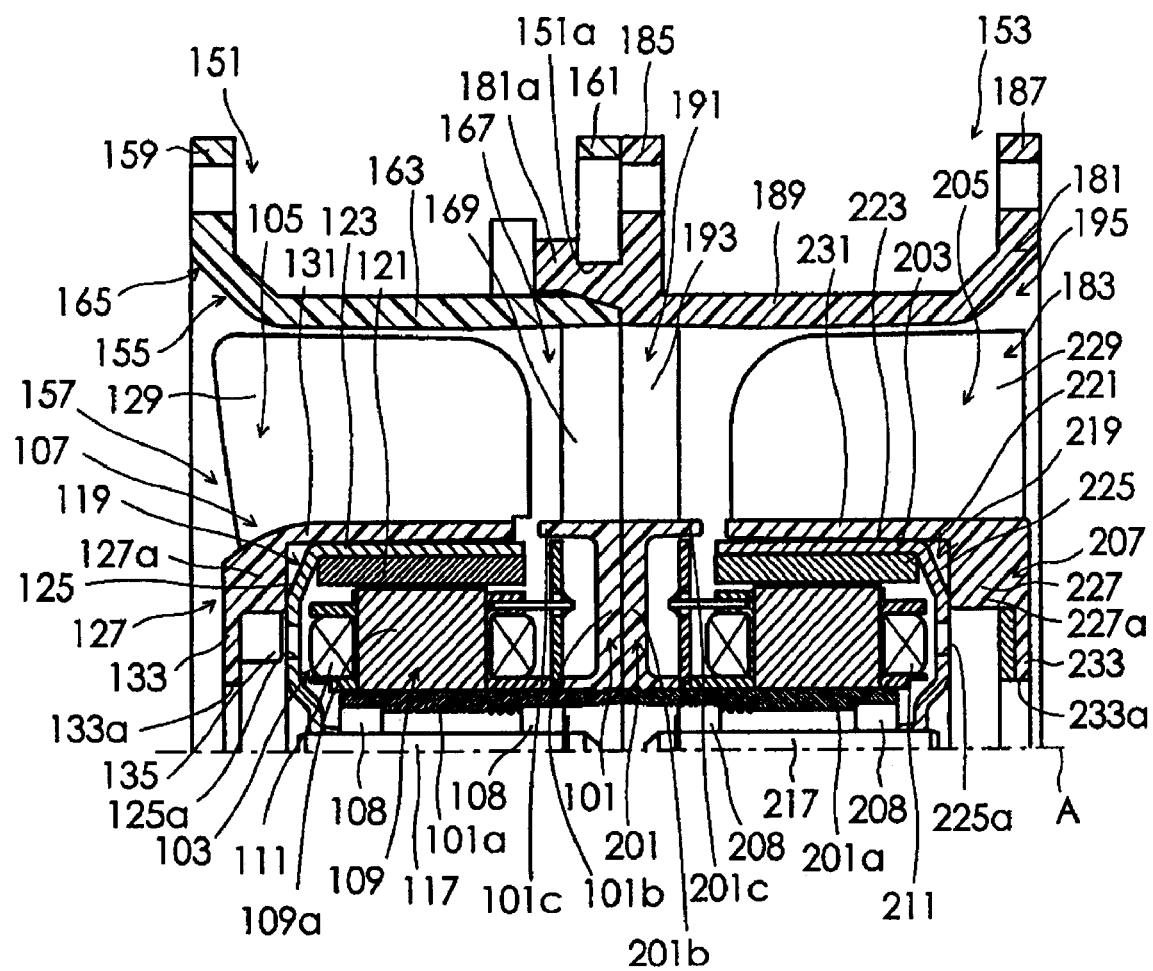
FIG. 4 is a sectional view of a half portion of a counter-rotating axial flow fan in an embodiment of the present invention.

FIG. 4 is a sectional view showing a half portion of a counter-rotating axial flow fan in an embodiment of the present invention, which uses the brushless fan motor of the present invention. In the counter-rotating axial flow fan of this embodiment is constituted from a combination of a first axial flow fan unit 151 and a second axial flow fan unit 153 via a coupling structure. The first axial flow fan unit 151 includes a first casing 155 and a first brushless fan motor 157 arranged inside the first casing 155. The first casing 155 includes an annular suction-side flange 159 on one side in a direction where an axis line A extends (an axial direction), and an annular discharge-side flange 161 on the other side in the axial direction. The first casing 155 includes a cylindrical portion 163 between the flanges 159 and 161. An inside space formed by the flange 159, flange 161, and the cylindrical portion 163 constitutes an air channel. The suction-side flange 159 has a substantially rectangular contour, and includes a suction-side opening 165 therein. The discharge-side flange 161 also has a substantially rectangular contour, and includes a discharge-side opening 167 therein. Inside the discharge-side opening 167, three webs 169 are arranged at equidistant intervals in a circumferential direction of a rotary shaft 117 of the first brushless fan motor 157. The three webs 169 respectively extend in a radial direction of the rotary shaft 117 (or extend radially). The first brushless fan motor 157 is fixed to the first casing 155 with these three webs 169. The three webs 169 are respectively combined with three webs 193 of the second axial flow fan 153, thereby forming three stationary blades.

The number of blades of the first brushless fan motor 157 is seven. The first brushless fan motor 157 has the same structure as that of the brushless fan motor shown in FIG. 1, except the number of the blades. For this reason, by adding 100 to reference numerals of parts of the brushless fan motor shown in FIG. 1, a description about the structure of the first brushless fan motor 157 is omitted. Accordingly, in an end plate portion 125 of the first brushless fan motor 157, four through holes 125a are formed, piercing the end plate portion 125 in an axial direction of the rotary shaft 117. Further, a center through hole 133a that pierces a bottom wall portion 133 in the axial direction of the rotary shaft 117 is formed in the center of the bottom wall portion 133. Then, on an inner wall portion of the bottom wall portion 133 that faces the end plate portion 125, five vane portions 135 are formed.

The first casing 155 and a cover member 101 of the first brushless fan motor 157 are integrally formed in a condition that the three webs 169 of the first casing 155 are coupled to an outside cylindrical portion 101c of the first brushless fan motor 157. Then, the first brushless fan motor 157 is arranged so that the bottom wall portion 133 of a cap member 127 is located in the suction-side opening 165.

The first brushless fan motor 157 rotates at a rotational speed faster than a rotational speed of a second brushless fan motor 183 that will be described below, in a counterclockwise direction as seen from the first axial flow fan unit 151, or as seen from a left side of FIG. 4.

The second axial fan unit 153 includes a second casing 181 and the second brushless fan motor 183 arranged inside the second casing 181. The second casing 181 includes a suction-side flange 185 in one side in the direction where the axis line A extends (axial direction), and a discharge-side flange 187 on the other side of the axial direction. The second casing 181 includes a cylindrical portion 189 between the flanges 185 and 187. An inside space formed by the flange 185, the flange 187, and the cylindrical portion 189 constitutes an air channel. The suction-side flange 185 has a substantially rectangular contour, and includes a suction-side opening 191 inside the suction-side flange 185. The discharge-side flange 187 also has a substantially rectangular contour, and includes a discharge-side opening 195 inside the discharge-side flange 187. Inside the suction-side opening 191, three webs 193 are arranged at equidistant intervals in a circumferential direction of a rotary shaft 217 of the second brushless fan motor 183. The three webs 193 respectively extend in a radial direction of the rotary shaft 217 (or extend radially). The second brushless fan motor 183 is fixed to the second casing 181 with the three webs 193. The three webs 193 are respectively combined with the three webs 169 of the first axial flow fan unit 151, thereby forming the three stationary blades.

In the counter-rotating axial flow fan of this embodiment, a hook 181a of the second casing 181 of the second axial flow fan unit 153 is fitted into a fitting groove 151a of the first axial flow fan unit 151. The first axial flow fan unit 151 is thereby combined with the second axial flow fan unit 153. Such a combining structure is formed by using a known method disclosed in Japanese Patent Publication No. 2004-278371 or the like.

The second brushless fan motor 183 rotates in a clockwise direction as seen from the first axial flow fan unit 151, or as seen from the left side of FIG. 4, or in the direction opposite to the rotational direction of the first brushless fan motor 157. As described above, the second brushless fan motor 183 rotates at the speed slower than the rotational speed of the first brushless fan motor 157.

The second brushless fan motor 183 has the same structure as that of the brushless fan motor shown in FIG. 1, except for an impeller. For this reason, by adding 200 to reference numerals of parts of the brushless fan motor shown in FIG. 1, a description about the structure of the second brushless fan motor 183 is omitted.

An impeller 207 of the second brushless fan motor 183 integrally includes a cap member 227 and five blades 229 mounted on the cap member 227, and is formed by injection molding a synthetic resin made of ABS/PBT. The five blades 229 are respectively formed into a shape which allows air to flow from left to right in FIG. 4 when the second brushless fan motor 183 rotates in the clockwise direction as seen from the first axial flow fan unit 151, as seen from the left side of FIG. 4. The cap member 227 includes a peripheral wall portion 231 having an outer peripheral portion onto which the five blades 229 are mounted, and a bottom wall portion 233 disposed at one end of the peripheral wall portion 231. The bottom wall portion 233 faces an end plate portion 225 of a rotor cover 219. The cap member 227 is fit with the rotor cover 219. At the center of the bottom wall portion 233, a center through hole 233a is formed, piercing the bottom wall portion 233 in an axial direction of the rotary shaft 217. The four through holes 225a of the rotor cover 219 described above and the center through hole 233a are located at positions where the through hole 225a and the center through hole 233a do not face to each other. No vane portions are formed on this bottom wall portion 233. Then, the second brushless fan motor 183 is arranged so that the bottom wall portion 233 of the cap member 227 is located in the discharge-side opening 195.

A plate-like portion 101b of the first brushless fan motor 157 is in contact with a plate-like portion 201b of the second brushless fan motor 183 with the first axial flow fan unit 151 being combined with the second axial flow fan unit 153. With this arrangement, an end portion of a bearing holder 101a of the first brushless fan motor 157 is in contact with an end portion of a bearing holder 201a of the second brushless fan motor 183, thereby allowing heat transfer between the first brushless fan motor 157 and second brushless fan motor 183.

In the counter-rotating axial flow fan of this embodiment, when a rotor 105 of the first brushless fan motor 157 rotates, ambient air, which has been drawn in through the center through hole 133a of the cap member 127 by rotation of the vane portions 135 of the first brushless fan motor 157, is introduced inside a rotor cover 119 through the through holes 125a. With this arrangement, heat generated in a stator 103 of the first brushless fan motor 157 is dissipated to the outside, thereby cooling the stator 103. In the counter-rotating axial flow fan, the rotational speed of the first brushless fan motor 157 is generally faster than the rotational speed of the second brushless fan motor 183. Thus, the stator 103 of the first brushless fan motor 157 tends to be heated. In the present invention, the stator 103 of the first brushless fan motor 157 in the counter-rotating axial flow fan may be therefore efficiently cooled. In the present invention, in particular, the vane portions 135 are formed on the cap member 127 of the impeller 107. Accordingly, by forming the impeller 107 by injection molding using the synthetic region or by forming the impeller 107 of a casting such as a metal die-casting, the vane portions 135 may respectively be formed into a desired shape that exhibits sufficient cooling effect. For this reason, the cooling effect on the stator 103 may be enhanced.

Further, the center through hole 233a is formed in the center of the bottom wall portion 233 of the cap member 227 of the second brushless fan motor 183, and the through holes 225a are formed in the end plate portion 225 of the second brushless fan motor 183. Thus, ambient air introduced by rotation of the first brushless fan motor 157 passes through the rotor cover 219 of the second brushless motor 183, and then flows out through the through holes 225a. For this reason, a stator 203 of the second brushless fan motor 183 may also be cooled.

Further, the end portion of the bearing holder 101a of the first brushless fan motor 157 is in contact with the end portion of the bearing holder 201a of the second brushless fan motor 183, thereby allowing heat transfer therebetween. Thus, heat generated in the stator 103 of the first brushless fan motor 157 is transferred from the bearing bolder 101a of the first brushless fan motor 157 to the bearing holder 201a of the second brushless fan motor 183. For this reason, the cooling effect on the stator 103 of the first brushless fan motor 157 may be further enhanced.

What is claimed is:

1. A brushless axial flow fan motor, comprising:
   a rotor including:
      a rotor cover including a cylindrical portion and an end plate portion integrally disposed at one end of the cylindrical portion and fixed to a rotary shaft; and
      a plurality of permanent magnet magnetic pole portions disposed on an inner circumferential surface of the cylindrical portion;
   a stator disposed inside the rotor; and
   an impeller including a plurality of blades and a cap member onto which the blades are mounted, the cap member being fitted with the rotor cover;
   the cap member including a cylindrical peripheral wall portion having an outer peripheral portion onto which the blades are mounted, and a bottom wall portion disposed at one end of the peripheral wall portion and facing the end plate portion; wherein
   a center through hole is formed in a center of the bottom wall portion of the cap member, the center through hole piercing the bottom wall portion in an axial direction of the rotary shaft;
   a plurality of vane portions are formed on an inner wall portion of the bottom wall portion, which faces the end plate portion, at equidistant intervals in a circumferential direction of the peripheral wall portion, the vane portions being shaped to draw in ambient air through the center through hole; and
   a plurality of through holes are formed in the end plate portion at equidistant intervals in the circumferential direction so as to introduce the ambient air, which has been drawn in via the center through hole, inside the rotor cover, the through holes piercing the end plate portion in the axial direction,
   wherein the number of the vane portions is larger than the number of the through holes so that the vane portions do not face the through holes.

2. The brushless axial flow fan motor according to claim 1, wherein the through holes are disposed at positions which do not face the center through hole.

3. The brushless axial flow fan motor according to claim 2, wherein the through holes are disposed at positions which face windings of the stator.

4. The brushless axial flow fan motor according to claim 2, wherein the vane portions are formed at equidistant intervals in the circumferential direction of the peripheral wall portion;
   the through holes are formed at equidistant intervals in the circumferential direction; and
   the number of the vane portions is larger than the number of the through holes so that the vane portions do not face the through holes.

5. The brushless axial flow fan motor according to claim 1, wherein the vane portions and the cap member are integrally formed by injection molding or casting.

6. A counter-rotating axial flow fan, comprising:
   a first axial flow fan unit comprising a first brushless fan motor including an impeller, and a first casing including an air channel which has a suction-side opening on one side of the first brushless fan motor in an axial direction of a rotary shaft of the first brushless fan motor and a discharge-side opening on the other side of the first brushless fan motor in the axial direction, the impeller rotating inside the suction-side opening; and
   a second axial flow fan unit comprising a second brushless fan motor including an impeller, and a second casing including an air channel which has a suction-side opening on a first side of the second brushless fan motor in an axial direction of a rotary shaft of the second brushless fan motor and a discharge-side opening on a second side of the second brushless fan motor in the axial direction, the impeller rotating inside the discharge-side opening; the first casing of the first axial flow fan unit and the second casing of the second axial flow fan unit being coupled with a coupling structure;
   the first and second brushless fan motors respectively comprising:
      a rotor including a rotor cover including a cylindrical portion and an end plate portion integrally disposed at one end of the cylindrical portion and fixed to a rotary shaft; and
      a plurality of permanent magnet magnetic pole portions disposed on an inner circumferential surface of the cylindrical portion;
   a stator disposed inside the rotor; and
   the impeller including a plurality of blades and a cap member onto which the blades are mounted, the cap member being fitted with the rotor cover;
   the cap member including a cylindrical peripheral wall portion having an outer peripheral portion onto which the blades are mounted, and a bottom wall portion disposed at one end of the peripheral wall portion and facing the end plate portion;
   the first brushless fan motor being arranged so that the bottom wall portion of the cap member of the first brushless fan motor is located in the suction-side opening of the first brushless fan motor, and the second brushless fan motor being arranged so that the bottom wall portion of the cap member of the second brushless fan motor is located in the discharge-side opening of the second brushless fan motor; wherein a center through hole is formed in a center of the bottom wall portion of the cap member of the first brushless motor, the center through hole piercing the bottom wall portion in the axial direction of the rotary shaft of the first brushless fan motor;

a plurality of vane portions are formed on an inner wall portion of the bottom wall portion of the first brushless fan motor, which faces the end plate portion, at equidistant intervals in a circumferential direction of the peripheral wall portion, the vane portions being shaped to draw in ambient air through the center through hole; and a plurality of through holes are formed in the end plate portion of the first brushless fan motor at equidistant intervals in the circumferential direction so as to introduce the ambient air, which has been drawn in via the center through hole, inside the rotor cover, the through holes piercing the end plate portion in the axial direction of the rotary shaft of the first brushless fan motor, wherein the number of the vane portions is larger than the number of the through holes so that the vane portions do not face the through holes.

7. The counter-rotating axial flow fan according to claim 6, wherein a center through hole is formed in the center of the bottom wall portion of the cap member of the second brushless fan motor, the center through hole piercing the bottom wall portion in the axial direction of the rotary shaft of the second brushless fan motor; and a plurality of through holes are formed in the end plate portion of the second brushless fan motor at intervals in the circumferential direction, the through holes piercing the end plate portion in the axial direction of the rotary shaft of the second brushless fan motor.

8. The counter-rotating axial flow fan according to claim 7, wherein the through holes are disposed at positions which do not face the center through hole.

9. The counter-rotating axial flow fan according to claim 6, wherein the first and second brushless fan motors respectively have a metal bearing holder to receive a bearing which rotatably supports the rotary shaft; and the first and second axial flow fan units are combined in a condition that the bearing holder of the first brushless fan motor is in contact with the bearing holder of the second brushless fan motor to allow heat transfer therebetween.

\* \* \* \* \*